United States Patent
Buchheit

(10) Patent No.: US 10,108,716 B1
(45) Date of Patent: *Oct. 23, 2018

(54) SYSTEMS AND METHODS FOR PROVIDING STOCK TICKER INFORMATION

(71) Applicant: Google Inc., Mountain View, CA (US)

(72) Inventor: Paul Thomas Buchheit, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/297,094

(22) Filed: Oct. 18, 2016

Related U.S. Application Data

(63) Continuation of application No. 09/956,875, filed on Sep. 21, 2001, now Pat. No. 9,508,101.

(51) Int. Cl.
*G06F 17/30* (2006.01)
*G06Q 40/04* (2012.01)

(52) U.S. Cl.
CPC .. *G06F 17/30864* (2013.01); *G06F 17/30522* (2013.01); *G06Q 40/04* (2013.01)

(58) Field of Classification Search
CPC ........ G06F 17/30864; G06F 17/30522; G06Q 40/04
See application file for complete search history.

(56) References Cited

U.S. PATENT DOCUMENTS

| | | | |
|---|---|---|---|
| 4,330,845 A | 5/1982 | Damerau | |
| 4,334,270 A | 6/1982 | Towers | |
| 4,486,853 A | 12/1984 | Parsons | |
| 4,566,066 A | 1/1986 | Towers | |
| 5,502,637 A | 3/1996 | Beaulieu et al. | |
| 5,581,670 A | 12/1996 | Bier et al. | |
| 5,617,114 A | 4/1997 | Bier et al. | |
| 5,802,518 A | 9/1998 | Karaev et al. | |
| 5,819,271 A | 10/1998 | Mahoney et al. | |
| 5,864,871 A | 1/1999 | Kitain et al. | |

(Continued)

FOREIGN PATENT DOCUMENTS

WO    0175695    10/2001

OTHER PUBLICATIONS

Brin et al.; The Anatomy of a Large-scale Hypertextual Web Search Engine; Computer Networks and ISDN Systems; vol. 30; Issues 1-7; Apr. 1998; pp. 107-117; Proc. 7th Int. World Wide Web Conf.—available online at http://www.sciencedirect.com/science/article/pii/S016975529800110X.

(Continued)

*Primary Examiner* — Behrang Badii
*Assistant Examiner* — Daniel L Greene
(74) *Attorney, Agent, or Firm* — Middleton Reutlinger

(57) ABSTRACT

A system generates a ticker result, which may be a uniform resource locator (URL) corresponding to a quote provider. The system receives a string of information and determines whether all terms in the string of information correspond to ticker symbols. If all terms in the string of information correspond to ticker symbols, the system may ascertain whether the string of information corresponds to a query for ticker information. If the string of information corresponds to a query for ticker information, the ticker information (e.g., a ticker result) may be provided.

20 Claims, 8 Drawing Sheets

(56) References Cited

U.S. PATENT DOCUMENTS

| | | |
|---|---|---|
| 5,893,091 A | 4/1999 | Hunt et al. |
| 5,903,454 A * | 5/1999 | Hoffberg ............... G06F 3/0482 382/155 |
| 5,913,214 A | 6/1999 | Madnick et al. |
| 5,940,843 A | 8/1999 | Zucknovich et al. |
| 5,978,779 A | 11/1999 | Stein et al. |
| 5,987,432 A | 11/1999 | Zusman et al. |
| 6,038,561 A | 3/2000 | Snyder et al. |
| 6,055,538 A | 4/2000 | Kessenich et al. |
| 6,078,914 A | 6/2000 | Redfem |
| 6,078,924 A | 6/2000 | Ainsbury et al. |
| 6,092,074 A | 7/2000 | Rodkin et al. |
| 6,185,567 B1 | 2/2001 | Ratnaraj et al. |
| 6,282,537 B1 | 8/2001 | Madrick et al. |
| 6,351,747 B1 | 2/2002 | Urazov et al. |
| 6,631,372 B1 | 10/2003 | Graham |
| 6,665,679 B2 | 12/2003 | Curtis et al. |
| 6,681,211 B1 | 1/2004 | Gatto |
| 6,704,727 B1 | 3/2004 | Kravets |
| 6,748,385 B1 | 6/2004 | Rodkin et al. |
| 6,772,150 B1 | 8/2004 | Whitman et al. |
| 6,839,686 B1 | 1/2005 | Galant |
| 2001/0047355 A1 | 11/2001 | Anwar |
| 2001/0048736 A1 | 12/2001 | Walker et al. |
| 2001/0049649 A1 | 12/2001 | Baecker et al. |
| 2005/0256766 A1 | 11/2005 | Garcia et al. |

OTHER PUBLICATIONS

Aaron Wall; Hisotry of Search Engines: From 1945 to Google 2007; http://www.searchenginehistory.com; pp. 1-34; accessed May 23, 2010.

Conolly et al.; A Little History of the World Wide Web; p. 1-10; accessed May 23, 2010.

Wiley et al.; A History of Search Engines; pp. 1-9; accessed May 23, 2010.

* cited by examiner

SYSTEMS AND METHODS FOR PROVIDING STOCK TICKER INFORMATION

BACKGROUND OF THE INVENTION

Field of the Invention

The present invention relates generally to client-server networks and, more particularly, to systems and methods that provide financial information, such as stock ticker information.

Description of Related Art

Today, many users search for financial information on the Internet, and stock/mutual fund/market index "ticker information" (e.g., current price, past prices, volume, market capitalization, dividend, and other related information for a stock or a mutual fund) in particular. Typically, such searches require the user to find an online quote provider (e.g., Excite™ Money & Investing, Quote.com™, Fool.com™, MSN™ MoneyCentral™, ClearStation™, etc.), and then to fill in one or more ticker symbols (e.g., AAPL, IBM, VWNDX, etc.) within a specialized, ticker-only field. Such ticker-only fields typically process ticker information exclusively.

Such a limited, ticker-only format is not conducive to free-form text entry, for example typing a series of words and spaces and striking a return/enter key when finished. For example, "stock information for aapl" may not return a result when entered in a ticker-only field. Further, the entry of information into such ticker-only fields requires a user to search for and locate such a ticker-only field before obtaining stock/mutual fund/market index ticker information.

As a result, there exists a need for mechanisms that facilitate the provision of stock/mutual fund/market index ticker information, without requiring the entry of ticker symbols in dedicated, ticker-only fields.

SUMMARY OF THE INVENTION

Systems and methods consistent with the present invention address this and other needs through automatically determining whether a string of information is intended as a query for ticker information. By automatically determining whether any string is a query for ticker information, a stock/mutual fund quoting feature may be easily integrated with any number of applications that provide an information search capability.

In accordance with one purpose of the invention as embodied and broadly described herein, a method for processing a string of information includes receiving a string of information and determining whether all terms in the string of information correspond to ticker symbols. If all terms in the string of information correspond to ticker symbols, the method may ascertain whether the string of information corresponds to a query for ticker information. If the string of information corresponds to a query for ticker information, the ticker information may be provided.

In accordance with another implementation consistent with the present invention, a method for processing a string of information includes determining whether the string of information contains at least one term that does not correspond to a ticker symbol but that is characteristic of queries for ticker information, and removing the at least one term if present in the string of information to produce a modified string of information. The method may ascertain whether the modified string of information corresponds to a query for ticker information. If the string of information corresponds to a query for ticker information, the ticker information may be provided.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention automatically determine whether a string of information is intended as a query for ticker information, and provide ticker information from a quote provider if the string of information is so intended.

Exemplary Network

Figure 1:
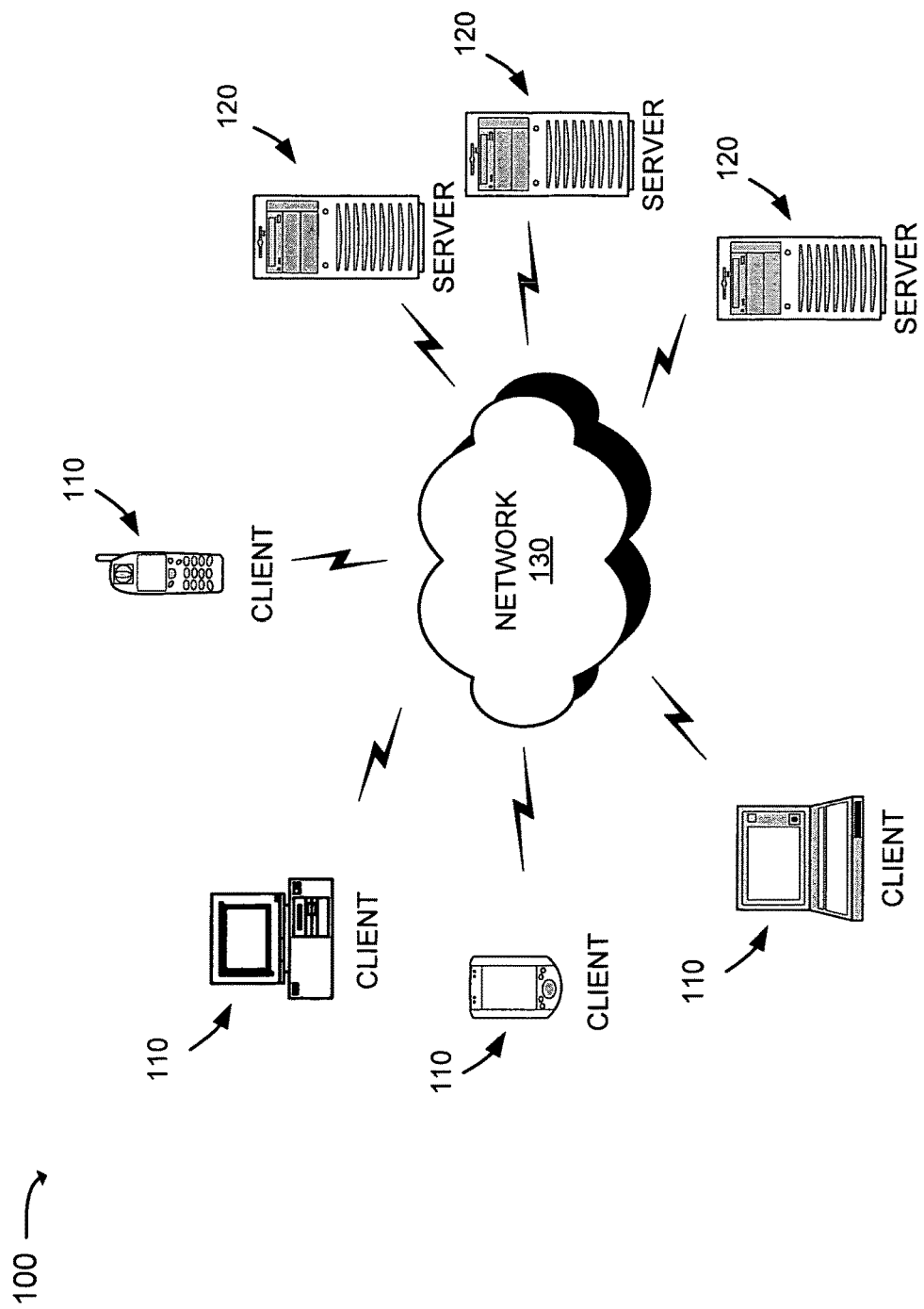
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120 via a network 130. The network 130 may include a local area network (LAN), a wide area network (WAN), a telephone network, such as the Public Switched Telephone Network (PSTN), an intranet, the Internet, a similar or dissimilar network, or a combination of networks. Four clients 110 and three servers 120 have been illustrated as connected to network 130 in FIG. 1 for simplicity of explanation. In practice, there may be more or less clients 110 and servers 120.

The clients 110 may include devices, such as wireless telephones, personal computers, personal digital assistants (PDAs), notebook computers, etc., threads or processes running on these devices, and/or objects executable by these devices. The servers 120 may include server devices, threads, and/or objects that operate or maintain web sites in a manner consistent with the present invention. The clients 110 and servers 120 may connect to the network 130 via wired, wireless, or optical connections.

Figure 2:
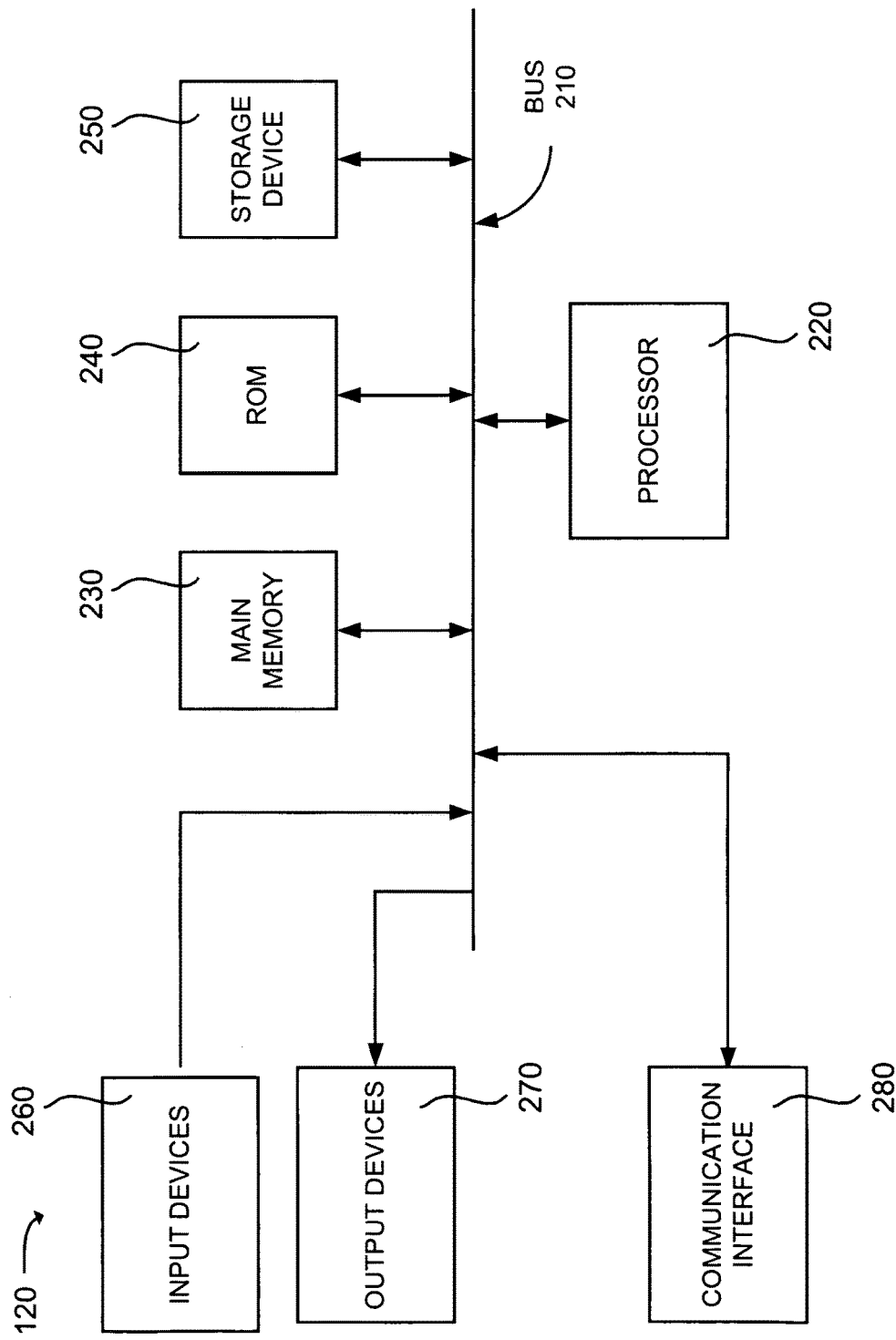
FIG. 2 is an exemplary diagram of a server of FIG. 1 in an implementation consistent with the present invention.

FIG. 2 is an exemplary diagram of a server 120 in an implementation consistent with the present invention. The server 120 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the server 120.

The processor 220 may include any type of conventional processor or microprocessor that interprets and executes instructions. The main memory 230 may include a random access memory (RAM) or another dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit an operator to input information to the server 120, such as a keyboard, a mouse, a pen, voice recognition and/or biometric mechanisms, etc. The output devices 270 may include one or more conventional mechanisms that output information to the operator, including a display, a printer, a speaker, etc. The communication interface 280 may include any transceiver-like mechanism (e.g., a network interface card) that enables the server 120 to communicate with other devices and/or systems. For example, the communication interface 280 may include mechanisms for communicating with another device or system via a network, such as network 130.

As will be described in detail below, a server 120, consistent with the present invention, provides a ticker result from information entered in a single field on a web page. The server 120 may perform this task in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 cause processor 220 to perform processes that will be described later. Alternatively, hardwired circuitry may be used in place of, or in combination with, software instructions to implement processes consistent with the present invention. Thus, the present invention is not limited to any specific combination of hardware circuitry and software.

Exemplary Web Pages for Providing Ticker Information

Figure 3:
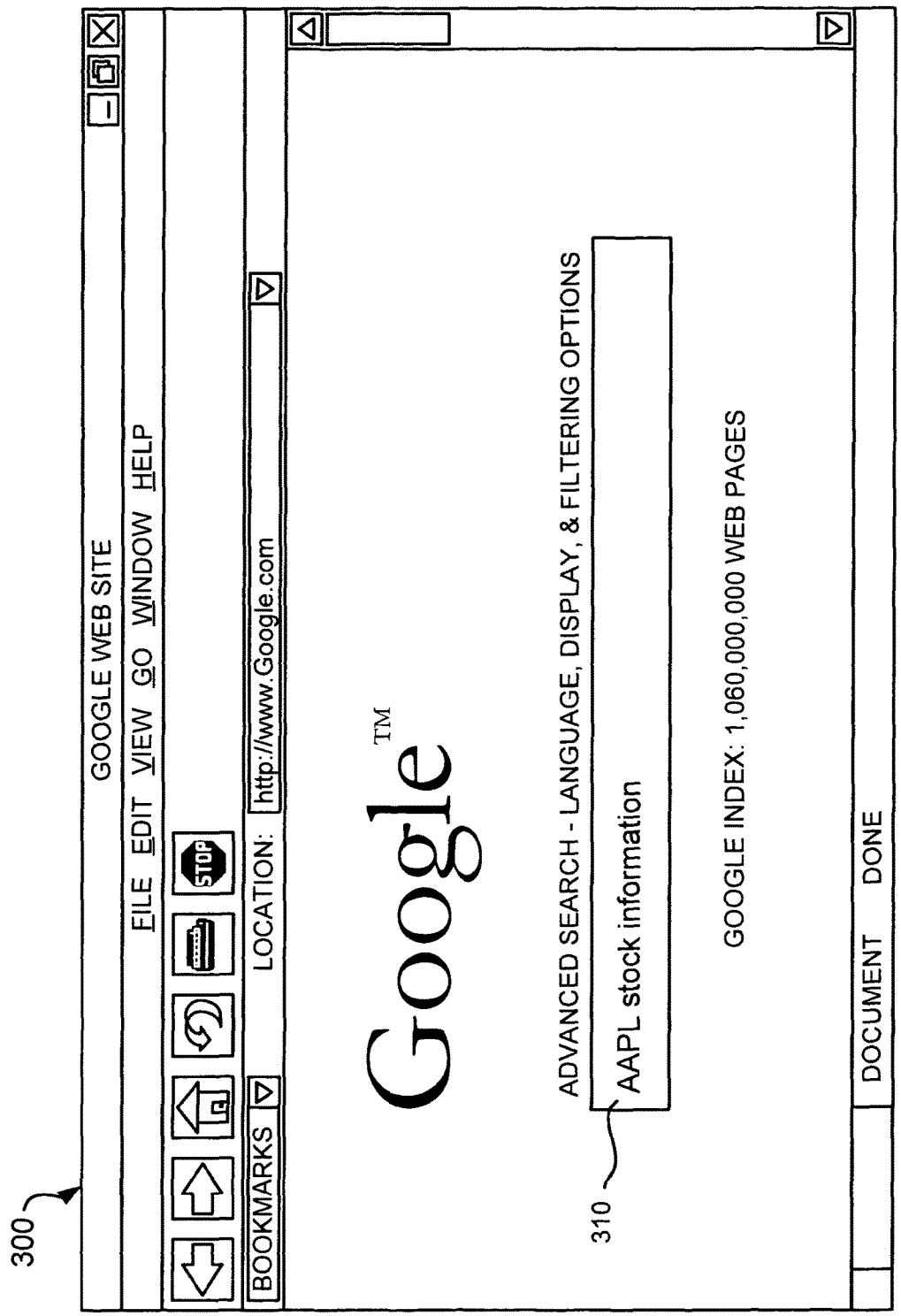
FIG. 3 is a diagram of an exemplary web page for entering a ticker information request according to an implementation consistent with the present invention.

FIG. 3 is a diagram of an exemplary web page 300 maintained by a server 120 according to an implementation consistent with the present invention. The web page 300 may include a field 310 in which a user may enter a string of text, and in particular a request for ticker information. As used herein, "string of text" or "text string" denotes any arbitrary string of information. The modifier "text" is included solely for ease of conceptual explanation, and should not be construed to limit the present invention to text-based information. The arbitrary string of information may be extracted from a web page or a file, or may be in the form of voice information (which is recognized by software and perhaps converted into text). As another example, the arbitrary string of information could be single sequence of characters (e.g., American Standard Code for Information Interchange (ASCII) characters) possibly including spaces, preferably containing one or more numbers or words. The user also may import a string of information (e.g., by cutting and pasting) from, for example, web pages, online invitations, or other electronic media. In the example shown, the following information request is entered in the field 310: "AAPL stock information." The web page 300 may be associated with a searching program, also known as a search engine, that is readable and executable by the server 120.

According to implementations consistent with the present invention, the server 120 may execute the searching program upon completed entry of text in the field 310. For example, the server 120 may execute the search program and return a results web page.

Figure 4:
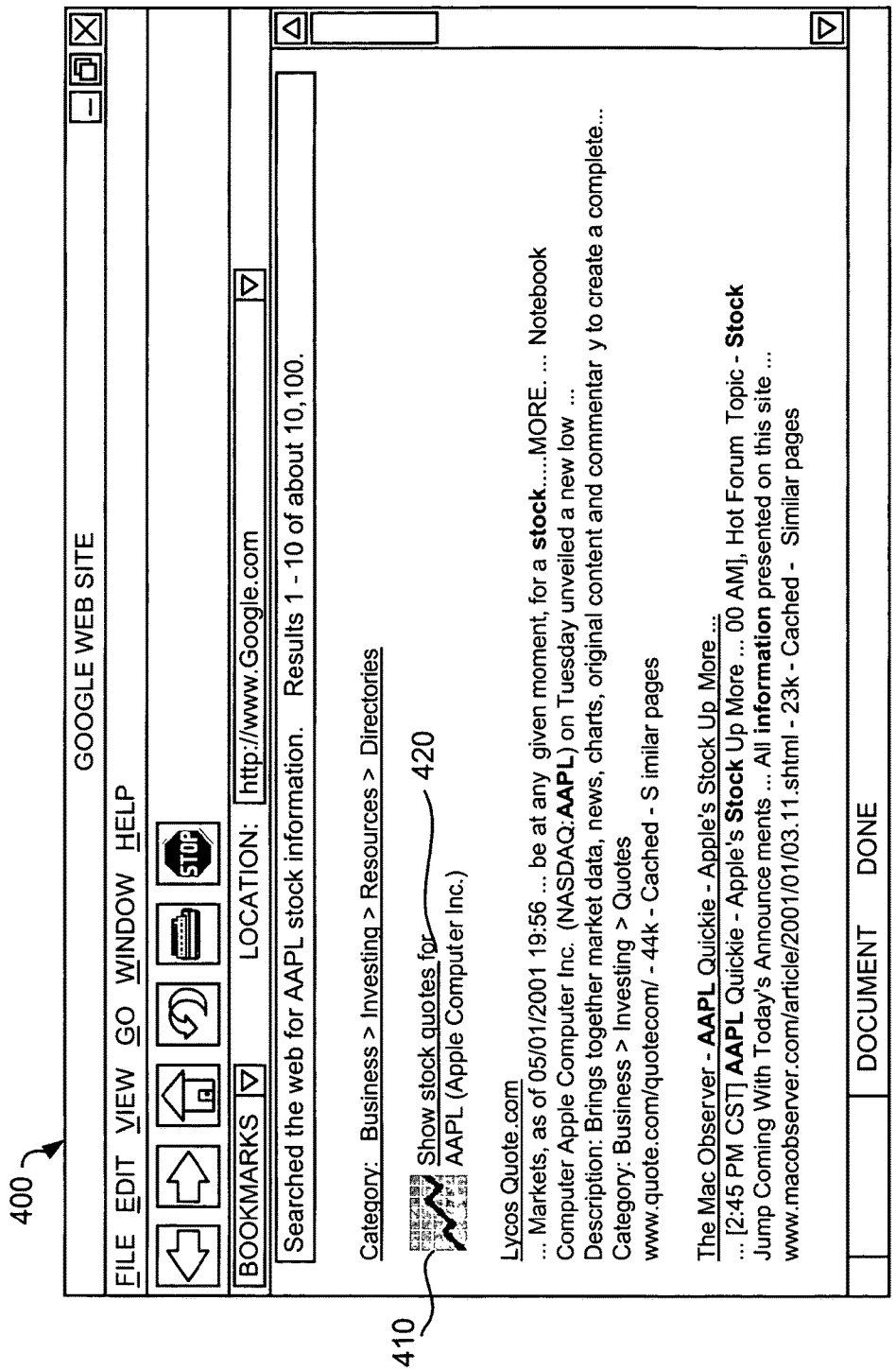
FIG. 4 is an exemplary web page containing search results for the ticker information request entered in FIG. 3 according to an implementation consistent with the present invention.

FIG. 4 is an exemplary web page 400 containing results of a search performed on the information request in FIG. 3 according to an implementation consistent with the present invention. In this example, a search on the information request has resulted in a ticker result being listed as the first search result. The ticker result may include a small financial icon or picture 410 to provide a visual clue to the user of the nature of the result. In addition, the ticker symbol(s) within the information request may be incorporated into an instruction that anticipates the user's intent and that gives direction and reinforcement to the user, such as "Show stock quotes for AAPL (Apple Computer Inc.)." Also, the ticker result may include one or more hyperlinks 420 that, when clicked, provide ticker information from an online quote provider. As may be seen in FIG. 4, the results web page 400 may include other search results from a conventional search performed on the text in the field 310.

In an alternate implementation consistent with the present invention, the results web page 400 may include detailed ticker information from an online quote provider, instead of the ticker result 410/420 and other search results shown in FIG. 4. For example, if the information request entered is "complete" according to some metric (e.g., contains only one or more unambiguous ticker symbols), then the searching program may infer that only ticker information is desired by the user. The searching program may directly transfer or redirect the user to the detailed ticker information from an online quote provider in such a case, without providing any additional search results.

Alternately, when the searching program finds significant ambiguity (i.e., when the searching program does not have a threshold level of confidence that the text in the field 310 is a request for ticker information), the web page 400 may not include a ticker result at all. The searching program may only return general search results associated with the information request. In such an instance, the web page 400 also may contain a query designed to resolve the ambiguity. For example, if a user mistakenly entered "stock information for IBMM," the returned query might be, "Did you mean stock information for IBM?" Clicking on the underlined term in the query may input an alternate text string to the search program that corresponds to a correct request for ticker information.

Figure 5:
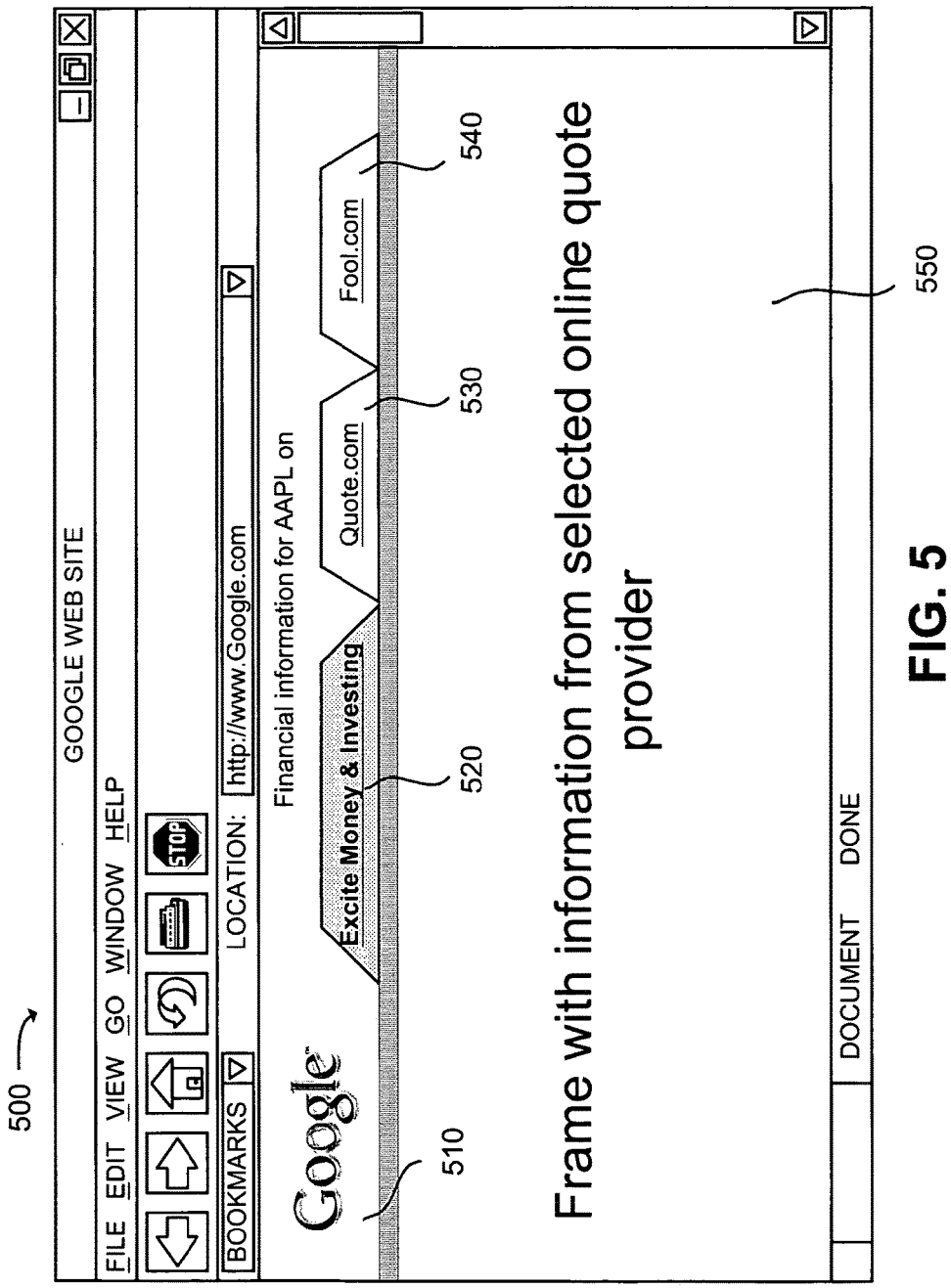
FIG. 5 is an exemplary web page containing ticker information obtained from a hyperlink in FIG. 4 according to an implementation consistent with the present invention.

FIG. 5 is an exemplary web page 500 containing ticker information obtained from clicking the hyperlink 420 in FIG. 4 according to an implementation consistent with the present invention. Alternately, the web page 500 may be a direct result of a search performed on the information request in FIG. 3. The web page 500 may contain a first frame 510 that includes one or more hyperlinks 520-540 to ticker information at one or more online quote provider sites. The first frame 510 may contain identifying search engine information (e.g., Google™) and text designating which ticker symbol (e.g., AAPL) is being displayed. The web page 500 also may contain a second frame 550 that includes the ticker information from one of the one online quote provider sites corresponding to a selected one of the hyperlinks 520-540. The currently selected tabbed hyperlink 520 may be displayed in a different texture or color, as is illustrated in FIG. 5, to provide a user a visual clue to the source of the information displayed in the second frame 550.

As used herein, a "hyperlink" refers to a link in a web page that leads to another web page, possibly on a different site. Hyperlinks are typically underlined, and may be a different color from the surrounding text. The hyperlinks 520-540 each may be associated with a uniform resource locator (URL). Typically, online quote providers define a syntax for linking to their site(s), so that hyperlinks 520-540 may take users directly to particular ticker information. In one implementation consistent with the present invention, the particular ticker information (possibly including a whole web page from the online quote provider) corresponding to the selected hyperlink (e.g., 520) may be displayed in the second frame 550. Those skilled in the art will appreciate other ways of displaying ticker information from one or more online quote providers in addition to the two-frame, multiple tab web page 500 illustrated in FIG. 5.

Exemplary Processing for Categorizing Ticker Symbols

The processing for providing ticker information described below does not require any indication from a user (e.g., entry of text into a ticker-only field) that ticker information is sought. Terms in a general query may be examined to determine whether the general query is likely a specific query for ticker information. Also, some ticker symbols may correspond to common words (e.g., each of THE CITY ROAD MAPS). To aid in providing ticker information, it is desirable to categorize ticker symbols/terms according to the likelihood that the terms are intended as ticker information requests, instead of a request for other information.

Figure 6:
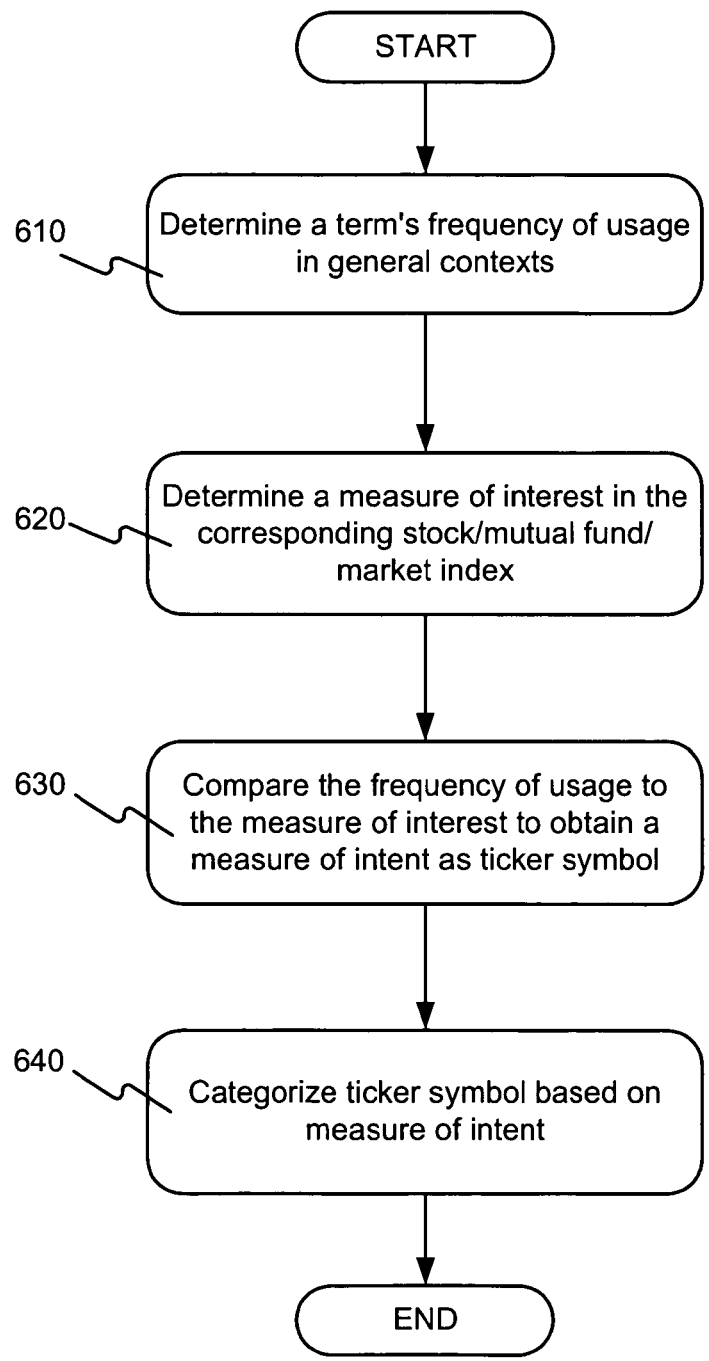
FIG. 6 is a flowchart of processing for categorizing ticker symbols in accordance with an implementation consistent with the present invention.

FIG. 6 is a flowchart of processing for categorizing ticker symbols in accordance with an implementation consistent with the present invention. The processing in FIG. 6 may be performed by a server 120, or on another computer or computers, and may be performed periodically to generate a look-up table or similar structure to categorize all existing stock/mutual fund/market index ticker symbols. The processing shown in FIG. 6 may be performed separately for each ticker symbol in a list of all currently active ticker symbols/terms.

Processing may begin by determining a term's frequency of usage in general (i.e., not necessarily financial) contexts [act 610]. One measure of a ticker term's frequency of usage in general contexts may be the "query log frequency" of the term. Search engines, for example, may keep logs or running totals of all search queries made, known as query logs. The "query log frequency" may be defined as the frequency with which the term in question appears relative to other terms in the log. Such a query log frequency may be a statistically meaningful measure of the general usage of a given term by the group of all users conducting searches on the Internet.

Other measures of a ticker term's frequency of usage in general contexts are possible. For example, in alternate implementations consistent with the present invention, usage frequencies may be determined from any relatively large body of text. For example, the frequency with which a term appears in a number of web pages may be substituted for the query log frequency of the term as a measure of the term's frequency of usage in general contexts.

Processing may continue by determining a measure of interest in the stock/mutual fund/market index that corresponds to the ticker term in question [act 620]. One measure of interest in the stock/mutual fund/market index that corresponds to the ticker term may be the trading volume of the stock/mutual fund/market index. Trading volumes over a given time frame may be a good gauge of how many people are actively interested in (and presumably seeking information on) a particular stock, for example. The time frame used for the trading volumes may be relatively short (e.g., hours or days) to accurately track interest in a stock that corresponds to the ticker term over potentially rapid events that may affect interest in the stock.

Other measures of interest in the stock/mutual fund/market index that corresponds to the ticker term are possible. For example, in alternate implementations consistent with the present invention, interest in a stock or mutual fund may be determined from the query frequency for its ticker symbol in the ticker-only fields of one or more online quote providers. Alternatively, the interest in a stock or mutual fund may be gauged by a market capitalization of the stock. Further, the interest in a stock or mutual fund may be gauged by a click-through rate of provided ticker results 410/420 (FIG. 4). Other possible measures of interest in a stock may include the frequency with which a corresponding company's home page appears in general search results; an amount of traffic that the company's home page receives; or the frequency with which the ticker symbol appears in user-customized portals (e.g., My Yahoo!™). Any of the above, or similar, measures may be substituted for the trading volume of the stock/mutual fund as a measure of the current interest in information about a ticker term.

Once the term's frequency of usage in general contexts and the measure of interest in the corresponding stock have been determined, the former may be compared against the latter to obtain a measure of intent to use a given term as a ticker symbol [act 630]. In one implementation, the frequency of general usage may be divided by the interest in the corresponding stock. In other words, the measure of intent may be expressed generally as:

measure of intent=(frequency of general usage)/(interest in the corresponding stock).

According to one implementation consistent with the invention described above, the measure of intent may be expressed as:

measure of intent=(query log frequency)/(trading volume).

Small values for this measure of intent may indicate that a given term is likely intended as a ticker symbol when encountered in a general query (e.g., INTC). Large values for this measure of intent may indicate that a given term is not likely intended as a ticker symbol when encountered in a general query (e.g., MAPS).

In one implementation consistent with the present invention, acts 610 and 630 may be performed in the context of both single-word queries and for multiple-word queries. For example, the term "A" (which is also a ticker symbol) may be very common in multiple-word queries, but may occur relatively rarely as a single-word query. Accordingly, in addition to determining, for example, the (total) query log frequency in act 610, the query log frequency for single word queries may also be determined. Using, these two query log frequencies, act 630 may calculate the measures of intent for a particular ticker symbol for both multiple word queries and when the symbol appears by itself in a query.

In another implementation consistent with the principles of the invention, the above-described differentiation between single-word and multiple-word queries may be further generalized to, for example, the context of terms in a multiple-word query. For example, "THE A" may be considered a query for ticker information, because the terms "the" and "a" rarely appear together in such an order.

Ticker symbols may be placed in one of several categories based on the calculated measure(s) of intent [act 640]. Although any number of categories may be devised, the following exemplary four categories (listed in increasing certainty) are convenient: 1) Ambiguous, 2) Single-word unambiguous, 3) Unambiguous, and 4) Disambiguating. The Ambiguous category may include ticker symbols that appear to be used often in non-ticker contexts (e.g., that have a somewhat high measure of intent). The Single-word unambiguous category may include ticker symbols that should be understood as ticker symbols when appearing alone, but that are otherwise ambiguous when appearing with other terms (e.g., that have a medium measure of intent in the single-word context, but a somewhat high measure of intent in a multiple-word context). The Unambiguous category may include ticker symbols that should be understood as ticker symbols when appearing either alone or with other terms (e.g., that have a somewhat low measure of intent in single and/or multiple-word contexts). The Disambiguating category may include ticker symbols that are more strongly unambiguous than those in the Unambiguous category (e.g., that have a very low measure of intent in single and/or multiple-word contexts).

Exemplary Processing for Providing Ticker Information

As noted previously, the exemplary processing for providing ticker information described hereinafter does not require any indication from a user (e.g., entry of text into a ticker-only field) that ticker information is sought. At the same time, it is desirable to avoid returning a ticker result when a user is not searching for ticker information. Several schemes may be implemented to discern whether a general query is or is not likely a query for ticker information ("ticker query"), possibly involving the above-described categorization processing. One such exemplary, processing scheme will be described with respect to FIG. 7. An alternate exemplary processing scheme for providing ticker information will be described with respect to FIG. 8.

Figure 7:
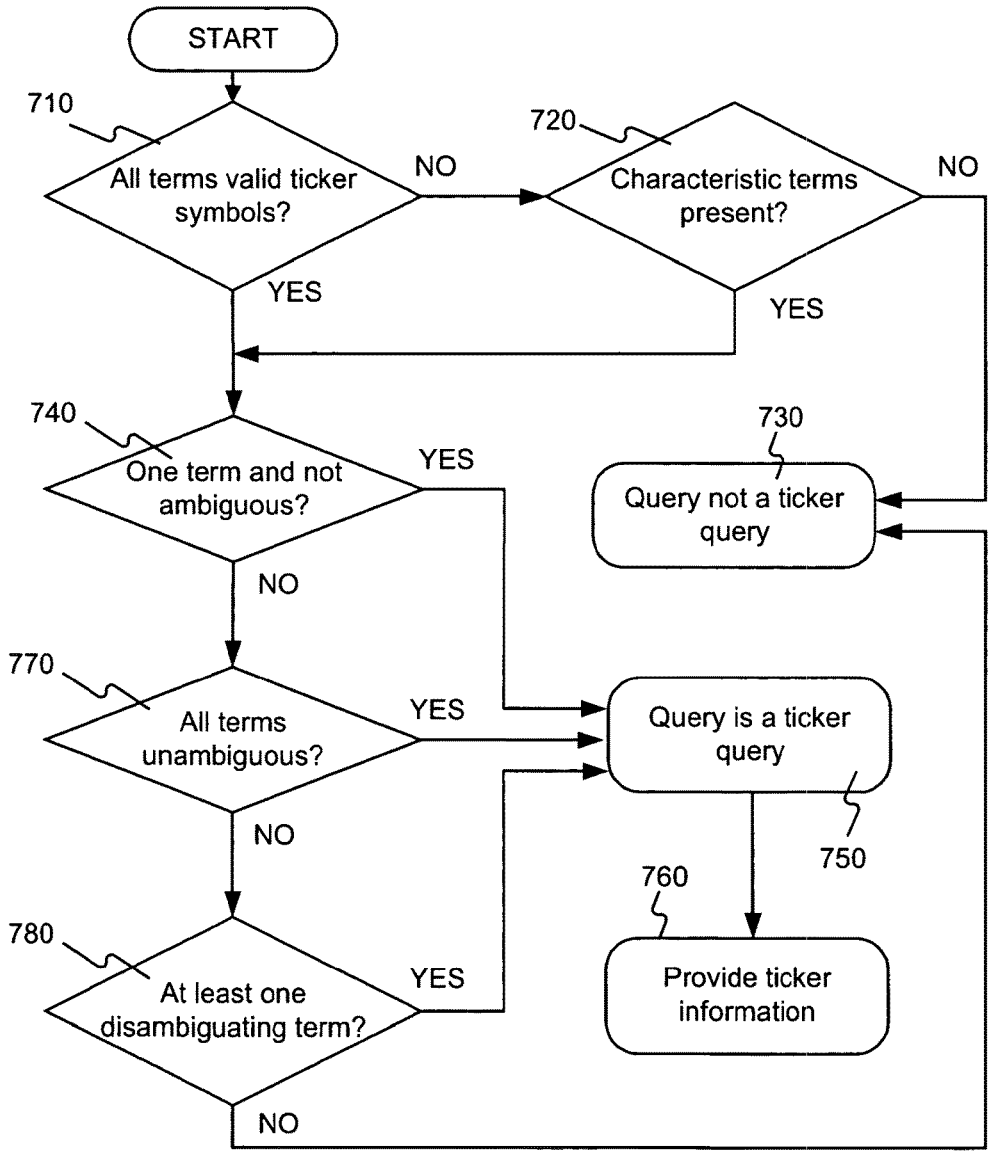
FIG. 7 is a flowchart of exemplary processing for providing ticker information in accordance with an implementation consistent with the present invention.

FIG. 7 is a flowchart of exemplary processing for providing ticker information in accordance with an implementation consistent with the present invention. The processing in FIG. 7 may be performed, for example, by a server 120 for each general query received. The processing may begin by determining whether all terms in the query (e.g., string of information) correspond to valid ticker symbols [act 710]. The server 120, or a software program embodied on a computer-readable medium, may check whether all terms in the query correspond to terms in a list of all existing stock/mutual fund/market index ticker symbols (e.g., those listed with the New York Stock Exchange (NYSE), the National Association of Securities Dealers Automated Quotation (NASDAQ), the American Stock Exchange (AMEX), etc.). Such a list may be periodically updated to allow for the new listing or de-listing of symbols.

If all terms in the query are not valid ticker symbols, the server 120 may determine whether one or more "characteristic terms" (e.g., characteristic of a ticker query but not ticker symbols) are present within the query [act 720]. Examples of such characteristic terms include "stock," "quotes," or other terms that would typically appear in a natural language ticker query in addition to ticker symbols. If no characteristic terms are present within the query, the server 120 may determine that the query is likely not a ticker query [act 730]. In such an instance, the server 120 may not return a ticker result with other search results generated from the query, or otherwise may not provide ticker information in response to the query. Queries that are determined not to be ticker queries may be stored in, for example, a table so that acts 710 and 720 may be avoided when subsequent identical queries are received.

If all terms in the query are valid ticker symbols (i.e., a Yes answer from act 710), or if characteristic terms are present (i.e., a Yes answer from act 720), the server 120 may determine whether the query contains one word and falls within the Single-word unambiguous category [act 740]. In the latter case (e.g., from act 720), any characteristic terms and "stop words" may be stripped from the query prior to performing act 740. As used herein, a "stop word" is a common word (e.g., "where," "of," etc.) that may be removed/stripped from a query, because it tends to slow down searches without improving the quality of results. However, in the ticker information processing described herein, stop words that are also ticker symbols (e.g., "A," "THE," "AND," etc.) may not be removed in or after step 720. If the query (possibly modified by removing terms) contains one word that falls within the Single-word unambiguous category, the server 120 may determine that the query is likely a ticker query [act 750]. In such an instance, the server 120 may return a ticker result with other search results generated from the query, or otherwise may provide ticker information in response to the query [act 760].

If the query contains more than one word, the server 120 may determine whether all terms in the query fall within the Unambiguous category [act 770]. If the query contains only terms that fall within the Unambiguous category, the server 120 may determine that the query is likely a ticker query [act 750]. In such an instance, the server 120 may return a ticker result with other search results generated from the query, or otherwise may provide ticker information in response to the query [act 760].

If all terms in the query do not fall within the Unambiguous category (e.g., if one or more terms are in the Ambiguous category), the server 120 may determine whether at least one term in the query falls within the Disambiguating category [act 780]. If the query contains at least one term in the Disambiguating category, the server 120 may determine that the query is likely a ticker query [act 750]. In such an instance, the server 120 may return a ticker result with other search results generated from the query, or otherwise may provide ticker information in response to the query [act 760]. However, if the query does not contains at least one term in the Disambiguating category, the server 120 may determine that the query is not likely a ticker query [act 730]. In such an instance, the server 120 may not return a ticker result with the other search results generated from the query, or otherwise may not provide ticker information in response to the query.

Variations on the above-described processing for providing ticker information are possible. For example, different ambiguity criteria than those in acts 740, 770, and 780 are possible to achieve differing rates of ticker information return. That is, the total ambiguity criteria could be relaxed or made more stringent to provide ticker information for more or fewer queries, respectively. Also, the order of acts 740, 770, and 780 may be changed.

Figure 8:
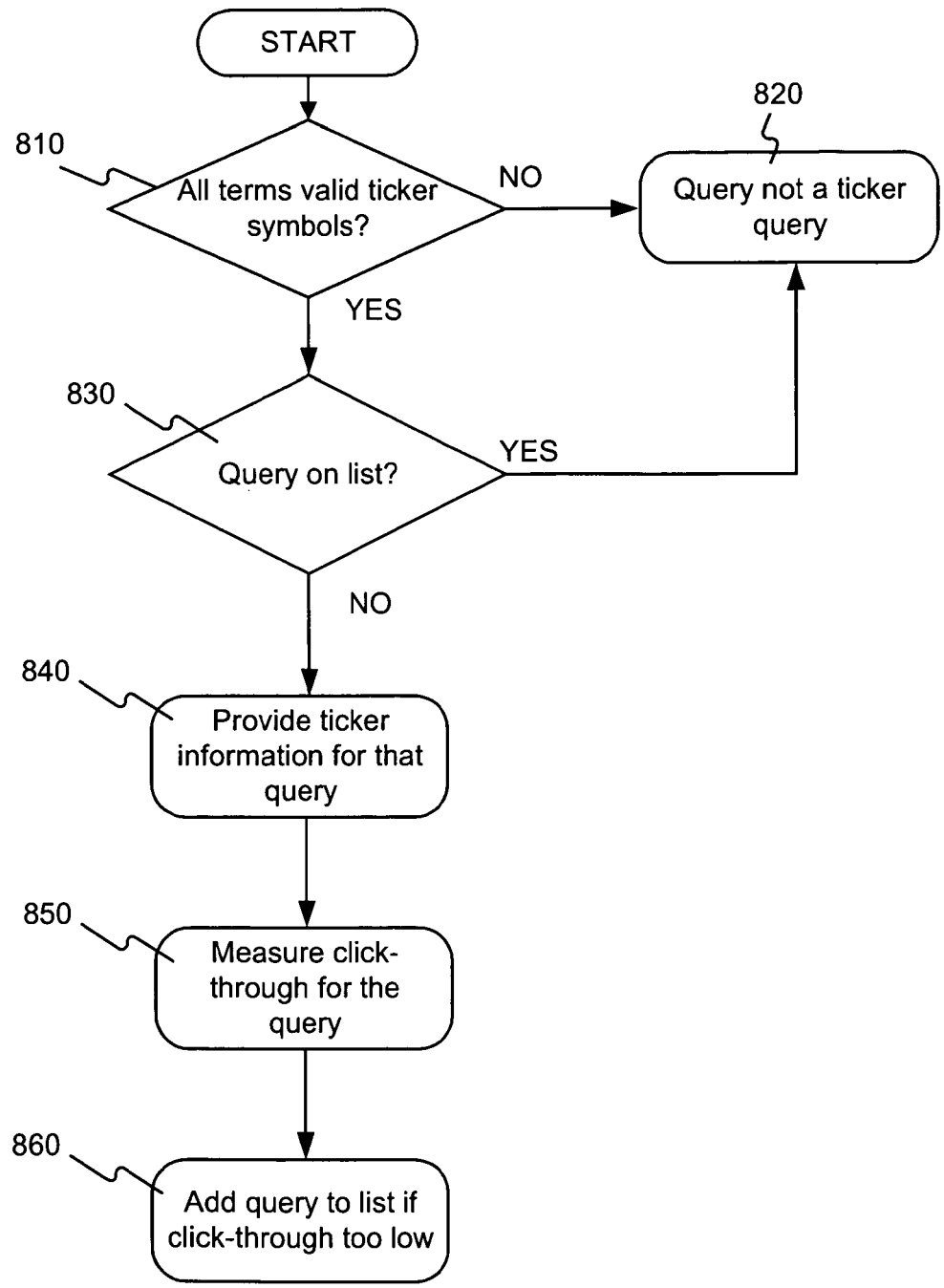
FIG. 8 is a flowchart of alternate exemplary processing for providing ticker information in accordance with another implementation consistent with the present invention.

FIG. 8 is a flowchart of alternate exemplary processing for providing ticker information in accordance with another implementation consistent with the present invention. The processing in FIG. 8 may be performed by a server 120, or on another computer or computers. The processing may begin by determining whether all terms in the query (e.g., string of information) correspond to valid ticker symbols [act 810]. The server 120, or a software program embodied on a computer-readable medium, may check whether all terms in the query correspond to terms in a list of all existing stock/mutual fund/market index ticker symbols.

If all terms in the query do not correspond to terms in the list of all existing ticker symbols, the server 120 may determine that the query is likely not a ticker query [act 820]. In such an instance, the server 120 may not return a ticker result with other search results generated from the query, or otherwise may not provide ticker information in response to the query. Queries that are determined not to be ticker queries in act 820 may be added to, for example, a list of invalid ticker queries so that act 810 may be avoided when subsequent identical queries are received. Although not shown in FIG. 8, act 810 may include testing for characteristic terms similar to act 720 in FIG. 7.

If all terms in the query are valid ticker symbols, the server 120 may then determine if the query is present on the list of invalid ticker queries [act 830]. This list of invalid ticker queries may initially be empty, except for queries added by act 820. Hence, the server 120 may initially provide ticker information (e.g., the ticker result 410/420 shown in FIG. 4) for all queries that contain only valid ticker symbols [act 840].

The server may keep a running total of the "click-through" on the provided ticker information for each query [act 850]. As used herein, the "click-through" may be defined as the percentage of time that users click, e.g., the hyperlink 420 when presented with a given ticker result. If, measured over a number of users, the click-through for the ticker result provided for a given query is too low, the query may be added to the list of invalid ticker queries [act 860].

The scheme in FIG. 8 ensures that eventually ticker results are not provided for ambiguous queries, without explicitly categorizing terms within the query, for example, as in FIG. 6. However, FIG. 8 may be related to the categorization of terms in the following manner. The total number of user views/impressions of a ticker result may approximate the query's usage in general contexts (e.g., search result web pages). The click-through associated with the ticker result may approximate the interest in the underlying stock. Thus, a measure of intent of a user for the query to be a ticker query may be expressed as:

measure of intent=(number of impressions)/(ticker result click-through).

As described previously, a low click-though corresponds to a high measure of intent and a low likelihood that the query was intended as a ticker query. Conversely, a high click-though corresponds to a low measure of intent and a high likelihood that the query was intended as a ticker query.

CONCLUSION

Methods and systems consistent with the present invention automatically determine whether a string of information is intended as a query for ticker information. The string of information may be provided in a free-form manner, or may be imported from an electronic source. In this manner, the provision of ticker information (e.g., stock or mutual fund quotes) is facilitated by returning a URL based on portions of the string of information.

Modifications and variations are possible in light of the above teachings or may be acquired from practice of the invention. For example, while series of acts have been described with regard to FIGS. 6-8, the order of the acts may be modified in other implementations consistent with the present invention. Although described in the context of entering text in a field of a web page, implementations consistent with the present invention may include any manner of entering a string of data that may or may not be converted to text prior to parsing by the program. One example is entry of data via voice-recognition software. Further, the number of ambiguity categories (e.g., four) may be changed, as may the number of associated contexts (e.g., single-word and multiple word). Moreover, as previously indicated, the number and strictness of conditions in, for example, FIG. 7 may be altered to change the frequency with which a general query will be considered a ticker query.

The foregoing description of preferred embodiments of the present invention provides illustration and description, but is not intended to be exhaustive or to limit the invention to the precise form disclosed. No element, act, or instruction used in the description of the present application should be construed as critical or essential to the invention unless explicitly described as such. As used herein, the article "a" is intended to include one or more items. Where only one item is intended, the term "one" or similar restrictive language is used. The scope of the invention is defined by the claims and their equivalents.

What is claimed is:

1. A method performed by one or more computer devices, comprising:
  receiving a string of information, the string of information including one or more ticker symbol terms and being based on input provided via one or more input devices;
  determining, based on presence of the one or more ticker symbol terms in the string of information, and based on at least one additional factor, that the string of information is intended as a request for ticker information rather than a request for non-ticker information;
  receiving the ticker information in response to a search for the ticker information, wherein the search for the ticker information is performed based on determining that the string of information is intended as a request for the ticker information; and
  presenting, via one or more output devices, the ticker information to a user in response to receiving the string of information without presenting any other search results to the user in response to receiving the string of information.

2. The method of claim 1, wherein the string of information is received via an interface that accepts entry of both search queries for ticker information and search queries for non-ticker information.

3. The method of claim 1, wherein the string of information is received via voice recognition.

4. The method of claim 1, wherein the at least one additional factor includes a trading volume corresponding to the one or more ticker symbol terms.

5. The method of claim 1, wherein the at least one additional factor includes a relationship between: a frequency of use of the one or more ticker symbols and a measure of interest in the one or more ticker symbols.

6. The method of claim 1, wherein the string of information further includes one or more additional terms and wherein the at least one additional factor includes that one or more characteristic terms are included in the additional terms, wherein the characteristic terms are characteristics of a ticker query but are not ticker symbols.

7. The method of claim 6, wherein the at least one additional factor further includes that the string of information includes only: the ticker symbol terms and the characteristic terms.

8. A method performed by one or more computer devices, comprising:
receiving a string of information from a client device, the string of information including one or more ticker symbol terms and being based on input provided via one or more input devices of the client device;
generating a measure of intent for the one or more ticker symbol terms, the measure of intent reflecting a likelihood that the one or more ticker symbol terms are intended as a request for ticker information rather than a request for non-ticker information,
performing a search for the ticker information when the generated measure of intent indicates that the one or more ticker symbol terms are intended as a request for the ticker information;
performing a search for the non-ticker information when the generated measure of intent indicates that the one or more ticker symbol terms are intended as a request for the non-ticker information; and
providing the ticker information or the non-ticker information to the client device.

9. The method of claim 8, further comprising:
identifying a frequency of usage of the one or more ticker symbol terms;
wherein generating the measure of intent is based on the identified frequency of usage of the one or more ticker symbol terms.

10. The method of claim 9, wherein generating the measure of intent is based on the identified frequency of usage of the one or more ticker symbol terms and at least one additional factor.

11. The method of claim 10, wherein identifying the frequency of usage of the one or more ticker symbol terms includes:
identifying a frequency in which the one or more ticker symbol terms appear in a query log relative to other terms in the query log, and
using information regarding the identified frequency to identify the frequency of usage.

12. The method of claim 10, wherein identifying the frequency of usage of the one or more ticker symbol terms includes:
identifying a frequency in which the one or more ticker symbol terms appear in a number of web pages relative to other terms appearing in the web pages, and
using information regarding the identified frequency to identify the frequency of usage.

13. The method of claim 10, wherein the means for identifying the measure of intent further includes:
identifying a frequency in which the one or more ticker symbol terms are received relative to other terms by one or more online quote providers, and
using information regarding the identified frequency to identify the measure of intent.

14. The method of claim 10, wherein the at least one additional factor includes a measure of interest in the one or more ticker symbol terms.

15. The method of claim 14, wherein the measure of interest is based on trading volume corresponding to the one or more ticker symbol terms.

16. A device comprising:
an input device;
an output device;
one or more processors executing instructions to:
receive a string of information, the string of information including one or more ticker symbol terms and being based on input provided via the input device;
determine, based on presence of the one or more ticker symbol terms in the string of information, and based on at least one additional factor, that the string of information is intended as a request for ticker information rather than a request for non-ticker information;
receive the ticker information in response to a search for the ticker information, wherein the search for the ticker information is performed based on determining that the string of information is intended as a request for the ticker information; and
present, via the output device, the ticker information to a user in response to receiving the string of information without presenting any other search results to the user in response to receiving the string of information.

17. The device of claim 16, wherein the string of information is received via an interface that accepts entry of both search queries for ticker information and search queries for non-ticker information.

18. The device of claim 16, wherein the at least one additional factor includes a relationship between: a frequency of use of the one or more ticker symbols and a measure of interest in the one or more ticker symbols.

19. The device of claim 16, wherein the string of information further includes one or more additional terms and wherein the at least one additional factor includes that one or more characteristic terms are included in the additional terms, wherein the characteristic terms are characteristics of a ticker query but are not ticker symbols.

20. The device of claim 19, wherein the at least one additional factor further includes that the string of information includes only: the ticker symbol terms and the characteristic terms.

* * * * *